(12) United States Patent
Iwamoto et al.

(10) Patent No.: US 7,330,278 B2
(45) Date of Patent: Feb. 12, 2008

(54) OPTICAL DISPLACEMENT MEASUREMENT DEVICE

(75) Inventors: Tadashi Iwamoto, Kawasaki (JP); Yoshihisa Tanimura, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 268 days.

(21) Appl. No.: 11/080,907

(22) Filed: Mar. 15, 2005

(65) Prior Publication Data
US 2005/0206905 A1 Sep. 22, 2005

(30) Foreign Application Priority Data
Mar. 18, 2004 (JP) .............................. 2004-078886

(51) Int. Cl.
*G01B 11/14* (2006.01)
*G02B 7/04* (2006.01)
*G02B 27/40* (2006.01)
*G02B 27/64* (2006.01)

(52) U.S. Cl. ............... 356/614; 356/622; 250/201.2
(58) Field of Classification Search .. 250/201.2–201.9, 250/559.24–559.9; 356/614
See application file for complete search history.

(56) References Cited

U.S. PATENT DOCUMENTS

| 4,281,931 A | * | 8/1981 | Chikama | 356/614 |
| 4,612,437 A | * | 9/1986 | Ohsato | 250/201.5 |
| 4,631,397 A | * | 12/1986 | Ohsato et al. | 250/201.4 |
| 5,068,541 A | * | 11/1991 | Kondo | 250/559.07 |
| 5,256,853 A | * | 10/1993 | McIntyre | 219/121.75 |
| 5,781,269 A | * | 7/1998 | Ito et al. | 356/624 |
| 7,009,713 B2 | * | 3/2006 | Seko et al. | 356/498 |

FOREIGN PATENT DOCUMENTS

| DE | 39 20 133 A1 | 1/1991 |
| EP | 0 137 517 A2 | 4/1985 |
| JP | 61-25011 | 6/1986 |
| JP | 7-43148 | 2/1995 |
| JP | 2002-131618 | 9/2002 |

\* cited by examiner

*Primary Examiner*—Gregory J. Toatley, Jr.
*Assistant Examiner*—Jarreas Underwood
(74) *Attorney, Agent, or Firm*—Rankin, Hill, Porter & Clark LLP

(57) ABSTRACT

An optical displacement measurement device for introducing light from a light source to an object through an optical system having an objective lens and for detecting light reflected from the object by a detection section to thereby measure a displacement of the object relative to the objective lens. In the optical displacement measurement device, the objective lens is a conical lens for advancing the light toward the object and for receiving light reflected from the object to direct to the detection section, and the displacement of the object relative to the objective lens is measured in consideration of the property that a shape of an detected image detected by the detection section varies depending on the displacement of the object relative to the objective lens.

7 Claims, 4 Drawing Sheets

OPTICAL DISPLACEMENT MEASUREMENT DEVICE

BACKGROUND OF THE INVENTION

1. Field of the Invention

The present invention relates to an optical displacement measurement device, and in particular to an optical displacement measurement device for directing light from a light source toward an object through an optical system which includes an objective lens, and detecting light reflected from the object using a detection section to thereby measure a displacement of the object relative to the objective lens.

2. Description of the Related Art

For non-contact measurement of an object displacement, optical probe methods, such as those described by Toyohiko Yatagai in "Applied Optics, Introduction to Optical Measurement" ($4^{th}$ version, Maruzen Co., Ltd., Mar. 15, 1992, p 120-124), are known. The optical probe methods described therein include a critical angle method, an astigmatic method, a knife edge method, a heterodyne method, and others. In any of these methods, a minute spot is caused to be formed on the surface of an object and light reflected from the object is collected and detected as for its condition. These methods can achieve highly sensitive detection, and devices which employ these methods can be made small and light-weight, such that they are suitable for use as, for example, an optical probe for optical measurement of surface roughness.

Further, Japanese Patent Laid-open Publication No. Hei 7-43148 discloses one automatic focusing technique referred to as a pinhole method. In a pinhole method, light reflected from an object and passing through an objective lens for light convergence is split into two light portions, and, while using pinhole plates which are respectively arranged ahead of the image point of one split light portion and behind the image point of another split light portion and optical detection devices provided immediately behind the respective pin hole plates, positional displacement between the object and the image point of the objective lens is detected based on outputs from the respective optical detection devices.

According to this automatic focusing technique, the object lens is controlled to move such that the light always focuses on an object. Thus, a displacement of the object can be measured based on the amount of movement of the lens.

Among these conventional non-contact methods for measuring an object displacement, an optical probe method, in particular, can attain a significantly high resolution. This method, however, suffers from a very narrow measurable range as a highly accurate detection range is limited to an area near the focal point. Specifically, accurate measurement is generally possible only within a range of a few μm, for example.

According to the automatic focusing technique and relevant improved technique disclosed in Japanese Patent Laid-Open Publication No. Hei 7-43148, control is made such that light always focuses on an object so that a displacement of the object can be measured based on the amount of movement of the lens. This method can realize a wider measurement range.

In an auto-focus operation, however, high speed measurement is not readily achievable should the surface of an object have discontinuous displacement due to a step, for example, as, in such a case, the lens would lose its direction to follow and another search operation may become necessary.

As described above, although a variety of non-contact displacement measurement methods have been proposed, these methods in conjunction with the advantages they provide, have remaining problems in view of their ability to obtain high precision, high speed, price reduction, usability, increased reliability, and so forth.

The present invention advantageously provides a readily operable optical displacement measurement device which employs a new method.

SUMMARY OF THE INVENTION

1. Principle of the Present Invention

According to the present invention, while utilizing optical characteristics of a conical lens, light from a light source is introduced into a lens having a conical shape before advancing toward an object, and light reflected from the object returns, passing through the objective lens. The returning light forms an image, and displacement of the object is measured based on the shape of the image.

FIG. 1 illustrates basic principle of the present invention. Specifically, an objective lens 4 having a conical shape is placed ahead of an object 2 for displacement measurement, and a light source (not shown) is placed on the side of the objective lens 4 other than the conical shape side where the object 2 is placed. Light 6 from the light source is incoming into the objective lens 4, advancing toward the object 2. The light is then reflected on the surface of the object 2, and returns, as light 8, passing through the conical objective lens 4.

In FIG. 1, for simplicity of the drawing, only the trajectory of that half of the light which actually enters, that is, light 6 which is introduced into the upper half of the objective lens 4, is shown. Also, for brevity of the explanation, it is defined that the light 6 is a collimated beam, the optical axis of which is parallel to the central optical axis 5 of the objective lens 4. The object 2 is placed perpendicular to the central optical axis 5.

In FIG. 1, the light 6, which is a collimated beam entering, from behind, the objective lens 4 having a conical shape, is refracted, while remaining as a collimated beam, on the conical boundary surface at a refraction rate which is determined depending on the material of the objective lens 4. The refracted light advances at that angle towards the object 2, and is reflected, while remaining as a collimated beam, on the surface of the object 2 at a reflection angle equal to the incoming angle before returning toward the conical portion of the objective lens 4. The returning light is again refracted on the conical boundary surface to thereby be reshaped into light 8 which is parallel to the optical axis of the light 6.

Here, through comparison between the light 6 and the light 8, it is known that the light 8 is offset relative to the central optical axis 5 of the objective lens 4. That is, when the light parallel incoming into the upper half of the objective lens 4 is reflected on the object 2 and returns, as light 8, passing through the lower half of the objective lens 4, the light 8 is a collimated beam which is offset relative to, and parallel to, the central optical axis 5 of the objective lens 4.

It can be readily understood from FIG. 1 that the amount of the offset of the light 8 relative to the central optical axis 5 may vary depending on the position of the object 2. That is, when the object 2 changes its position, or displacement $\Delta x$, along the central optical axis 5 of the objective lens 4, the offsets $\Delta y1$, $\Delta y2$ of the light 8, which can be measured on a plane perpendicular to the central optical axis 5, also vary depending on the displacement $\Delta x$.

It should be noted that Δy1 represents the amount of offset of the returning light 8 corresponding to the outermost running light incoming into the objective lens 4 relative to the central optical axis 5, while Δy2 represents the amount of offset of the returning light 8 corresponding to the innermost running light incoming into the objective lens 4 relative to the central optical axis 5. That is, Δy1 and Δy2 define the range of the returning light 8. When the range is considered as an image formed by the returning light 8, it can be stated in another manner that the Δy1, Δy2 define the outline of the image.

For example, suppose that the outermost running light of the incoming beam 6 is refracted by the conical objective lens 4 and intersects the central optical axis 5 at point $P_0$. When the object 2 is located at point $P_0$, the offset Δy1 becomes maximum.

Although the above description involves only the light 6 incoming into the upper half of the objective lens 4, when a collimated beam having a round cross section which is symmetrical relative to the central optical axis 5 is introduced into the objective lens 4, the returning light 8 has a doughnut-shaped, ring-like cross section, with an inner radius corresponding to the offset Δy1 and an outer radius corresponding to the offset Δy2. Therefore, measurement of the offset Δy1 or Δy2 makes it possible to determine displacement of the object 2.

As described above, while utilizing the optical characteristics of a conical lens, the present invention introduces light from a light source into an object through a conical lens, and detects the shape of an image formed by the light returning from the object through the conical lens, whereby displacement of the object is measured.

2. Means to Solve the Problem

According to the present invention, there is provided an optical displacement measurement device for introducing light from a light source to an object through an optical system having an objective lens and for detecting light reflected from the object by a detection section to thereby measure a displacement of the object relative to the objective lens. In the optical displacement measurement device, the objective lens may be a conical lens for advancing the light toward the object and for receiving light reflected from the object to direct to the detection section, and the displacement of the object relative to the objective lens may be measured based on a fact that a shape of an detecting image detected by the detection section varies depending on the displacement of the object relative to the objective lens.

Preferably, the detecting image may be substantially doughnut-shaped (shaped like a doughnut ring). Also preferably, the displacement may be measured based on an inner diameter of the substantially doughnut-shaped detected image.

In the optical displacement measurement device according to the present invention, preferably, the displacement may be measured based on the maximum inner diameter of the substantially doughnut-shaped detected image. Here, the substantially doughnut-shaped detected image consists of an inner ring shaped image and an outer ring shaped image. The maximum inner diameter means the longest distance across the inner ring shaped image. For example, when the light from the light source is a collimated beam having a round cross section, an elliptical image would be detected should the object be placed inclining. As the maximum diameter of the elliptical image remains unchanged, the displacement of the object can be determined based on the maximum diameter.

Further preferably, the detection section may comprise an image sensing device. The shape of the detecting image can be determined with a very high accuracy by using the image sensing device.

Further, the conical objective lens may be a lens having a conical shape for receiving and refracting the light reflected from the object, when the object is placed in a displacement measurement range defined between a far-side intersecting point and a near-side intersecting point, such that the light returns toward a detection section side and forms an image of the object, the size of which varies according to the displacement of the object relative to the objective lens. In the above, the far-side intersecting point is a point at which an outermost running light which is refracted at an external circumferential portion of the conical objective lens intersects a central optical axis of the conical objective lens, and the near-side intersecting point is a point at which a light portion which is refracted at a tip end of the conical objective lens intersects the outermost running light.

The offset on the inner diameter side of the detecting image becomes maximum when the object is located at the far-side intersecting point and zero at the near-size intersecting point. Therefore, when the object is located somewhere in the range defined between the far-side and near-side intersecting points, any change in the shape of the detecting image can be detected with a very high accuracy.

Still further, the optical system may comprise a beam splitter for splitting a collimated beam from the light source and advancing light of S polarized component towards the object; a quarter-wavelength retardation plate for converting the light of S polarized component advancing from the beam splitter into light of circular polarization before a resultant light advances toward the object, and for converting light of circular polarization reflected from the object into light of P polarized component before a resultant light returns to the beam splitter; and an objective lens having a conical shape and provided between the quarter-wavelength retardation plate and the object. In the optical system, an image formed by the light of P polarized component which returns from the object and passes through the quarter-wavelength retardation plate and the beam splitter may be detected using the detection section. With this arrangement, the light advancing toward the object and the light reflected from the object and forming an image for detection can be separated. This makes it easier to measure displacement of the image.

As described above, with an optical displacement measurement device of the present invention, displacement of an object can be readily measured in the novel manner described herein.

BRIEF DESCRIPTION OF THE DRAWINGS

A preferred embodiment of the present invention will be described in detail based on the following figures, wherein.

DESCRIPTION OF THE PREFERRED EMBODIMENT

In the following, an embodiment of the present invention will be described in detailed with reference to the accompanying drawings.

Figure 2:
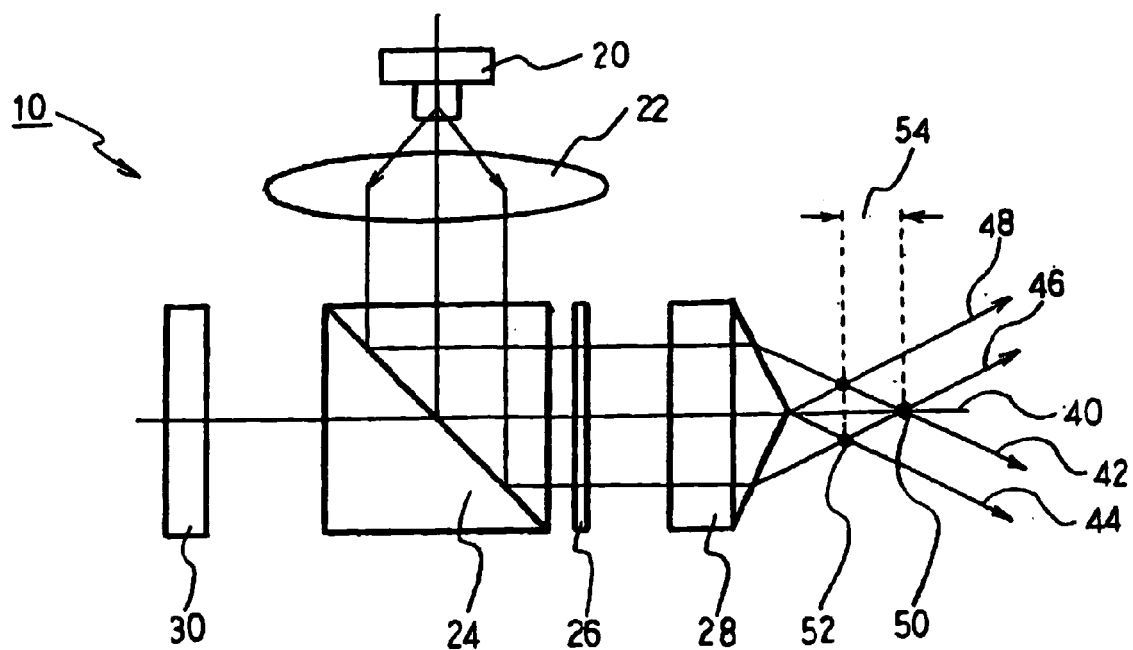
FIG. 2 is a diagram showing a structure of an optical displacement measurement device of the present invention.

FIG. 2 shows a structure of an optical displacement measurement device 10, which mainly includes a light source 20, an optical system containing a conical objective lens 28, and a detection section 30 for detecting an image of an object. It should be noted that, to simplify understanding, an enclosure for positioning and supporting these members and a displacement amount calculation section connected to the detection section 30, as well as certain other components, are not shown in FIG. 2.

In FIG. 2, the light source 20 emits light to irradiate an object placed in front of the objective lens 28. The light source 20 may be formed using a semiconductor laser or the like. A light emission diode and any other light emitting element may be usable as the light source 20, as long as it is optically stable.

A collimate lens 22 is placed ahead of the light source 20. As the collimate lens 22 reshapes the light from the light source 20 into a collimated beam, the light having passed through the collimate lens 22 can be a spot light of a collimated beam having a round cross section, for example.

The optical system comprises a beam splitter 24, a quarter-wavelength retardation plate 26, and an objective lens 28 having a conical shape. The central optical axis of the collimate lens 22 passes through the center of the reflection section of the beam splitter 24. In an example wherein the central optical axis of the collimate lens 22 is bent by 90 degrees at the center of the reflection section and extended further therefrom, the thus-extended axis corresponds to the central optical axis 40 of the objective lens 28. The central optical axis 40 passes through the center of the quarter-wavelength retardation plate 26. A detection section 30 is located on the extension of the central optical axis 40, extending on the side of the beam splitter 24, opposite from the side where the quarter-wavelength retardation plate 26 and so forth is located.

That is, the light source 20—the collimate lens 22—the beam splitter 24—the quarter-wavelength retardation plate 26—the objective lens 28—the object—the objective lens 28—the quarter-wavelength retardation plate 26—the beam splitter 24—the detection section 30 are all located such that the respective centers are positioned on the same axis which is bent by 90 degrees by the beam splitter 24.

The beam splitter 24 is an optical part for splitting a collimated beam received from the collimate lens 22 and bending S polarized component of the light by 90 degrees so as to advance toward an object, that is, the objective lens 28. The beam splitter 24 can be made by sandwiching a semi-transparent film between two right angle prisms, as shown in FIG. 2.

The quarter-wavelength retardation plate 26 is an optical element for converting an incoming light of S polarized component into light of circular polarization, and an incoming light of circular polarization into light of P polarized component, which has a 90-degree phase difference from S polarized light component. Such a quarter-wavelength retardation plate 26 can be formed by placing a film of known birefringence material, or the like, so as to incline by a predetermined angle relative to the central optical axis 40.

The objective lens 28 having a conical shape is an optical element having the central optical axis 40 as the central axis of its conical shape. The objective lens 28 refracts the light incident thereinto through its base surface side of the conical shape, on its conical boundary surface at a refraction rate which is determined depending on the material of the objective lens 28. The objective lens 28 further refracts the light incident thereinto from its conical side, on its conical boundary surface at the refraction rate such that the incoming light returns toward the base surface side of its conical shape.

Differing from a curved surface lens, a conical lens does not have a focal point at which an entire collimated beam converges. Instead, the light incoming into the conical objective lens through its base surface side while remaining parallel to the central axis of its conical shape converges at a point on the central axis of the conical shape, which is separated from the vertex point of the conical shape by a corresponding certain distance.

FIG. 2 is a cross sectional view of the optical displacement measurement device 10, including the central axis. Specifically, of the light incident to the upper half of the objective lens 28, refraction trajectories of the outermost running light 42 and the light 44 passing along the central optical axis are shown. Likewise, of the light incident to the lower half of the objective lens 28, refraction trajectories of the outermost running light 46 and the light 48 passing along the central optical axis are shown.

Figure 1:
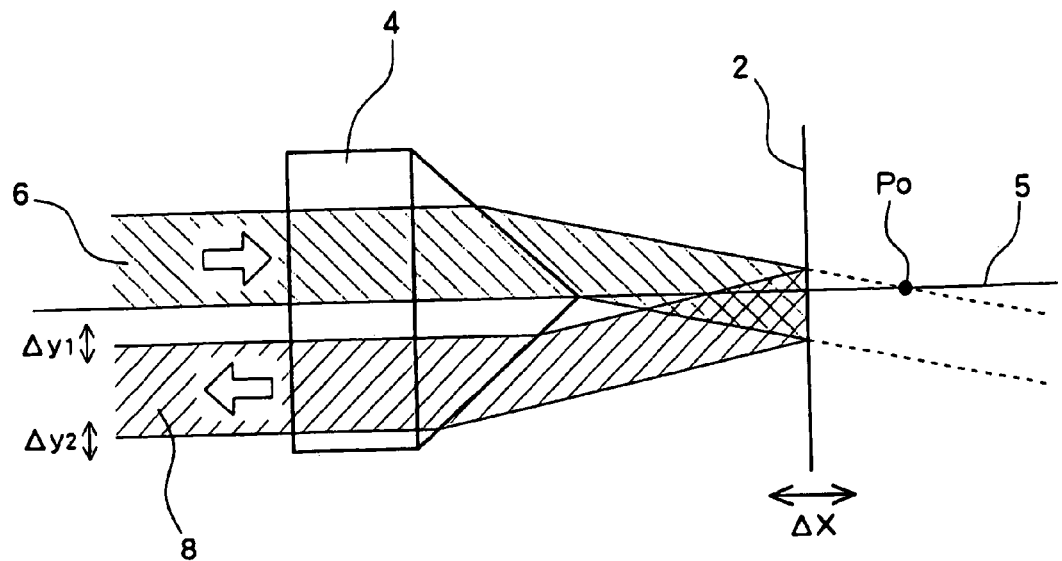
FIG. 1 illustrates a fundamental principle of the present invention.

The central optical axis 40 intersects the light 42 or 46 at point $P_0$, described in FIG. 1. This point defines the limit on the far point side of the range for object displacement measurement. This point is referred to as a far-side intersecting point 50. Meanwhile, the light 42 intersects the light 48 or the light 46 intersects the light 44 at a point which corresponds to the limit on the near point side of the range for object displacement measurement, as described later. These points are referred to as near-side intersecting points 52. That is, the range between the far-side intersecting point 50 and the near-side intersecting points 52 defines a displacement measurable range 54.

Advancement of light in this optical system will next be described.

Light from the light source 20 is reshaped by the collimate lens 22 into a spot of a collimated beam having a round cross section. Then, the light of S polarized component is bent by the beam splitter 24 by 90 degrees, and then converted by the quarter-wavelength retardation so as to have circular polarization. The resultant light is refracted by the conical objective lens 28 as described above before advancing toward an object (not shown).

The light irradiating the object is reflected at a reflection angle equal to the incident angle, and then again refracted by the conical objective lens 28 as described above. Because the incoming angle at the boundary of the conical shape is identical to the original refraction angle, the light having passed through the conical objective lens results in a collimated beam which is in parallel to the central optical axis 40.

Having passed through the objective lens 28, the circularly polarized light parallel to the central optical axis 40 is again converted by the quarter-wavelength retardation plate 26 into light having P polarized component before advancing straight through the beam splitter 24 along the central optical axis 40 to the detection section 30.

The detection section 30 detects the shape of an image which is formed on a plane perpendicular to the central optical axis 40 by the light returning from the object. The detection section 30 can be formed using an image sensing device. An example image sensing device may be CCDs (Charge Coupled Device) in a two dimensional arrangement. Alternatively, a semiconductor image sensing device, including photo transistors or photo diodes in a two dimensional arrangement may be employed.

The image sensing device, or the like, obtains two dimensional data, which is then sent to a displacement amount calculation section (not shown), where displacement of the object is calculated. More simply, the light returning from the object may be projected onto, to thereby form an image on, the detection section 30 which is a projection panel, and the size of the formed image is measured using a size measurement device or the like.

Figures 3A, 3B:
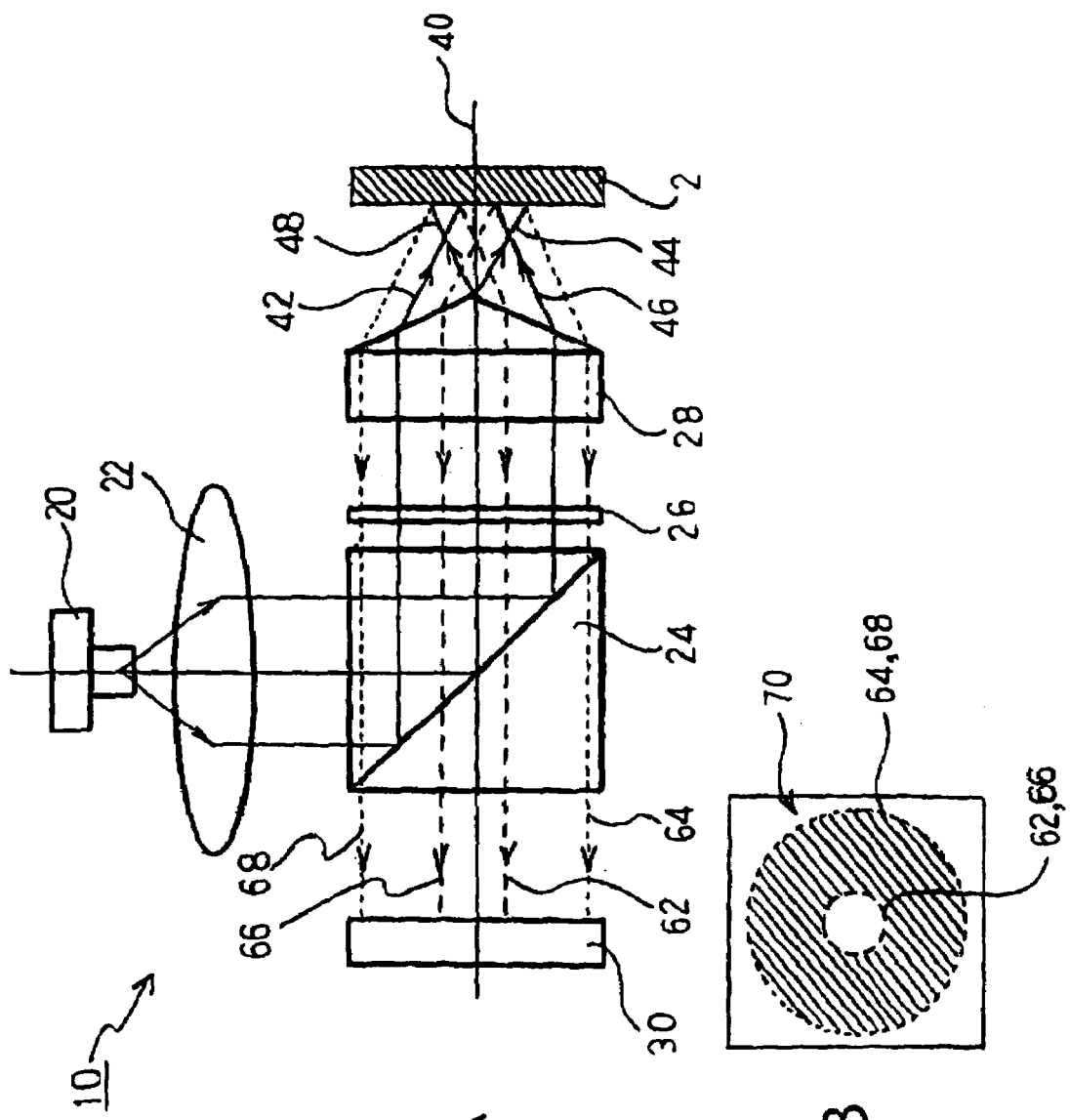
FIG. 3A is a diagram showing a structure with an object located substantially at the center of a measurement range according to the embodiment of the present invention.
FIG. 3B is a diagram showing a shape of the image detected by the detection section under FIG. 3A condition.
Figures 4A, 4B:
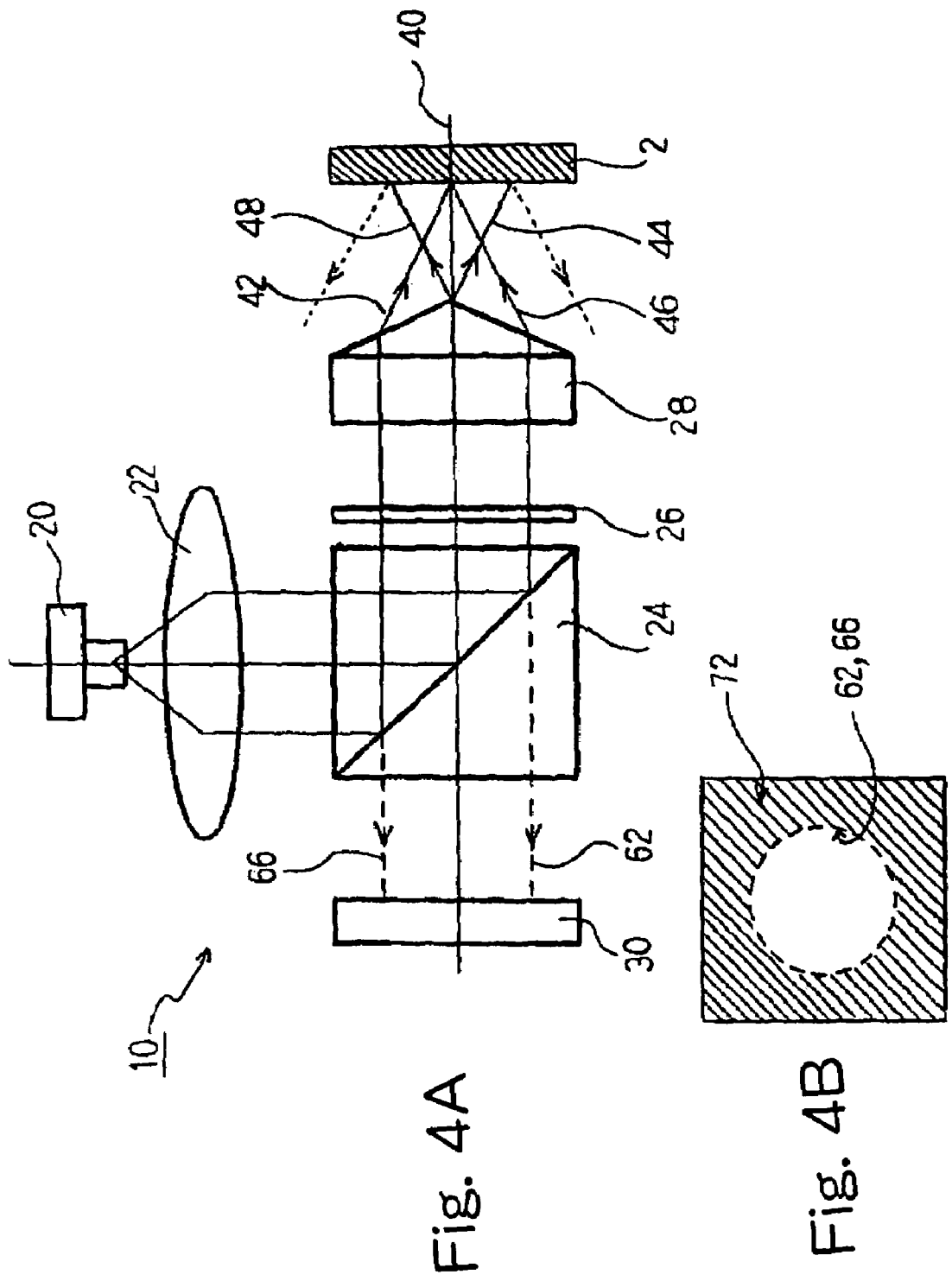
FIG. 4A is a diagram showing a structure with an object located at a far-side intersecting point of the measurement range according to the embodiment of the present invention.
FIG. 4B is a diagram showing a shape of the image detected by the detection section under FIG. 4A condition.
Figures 5A, 5B:
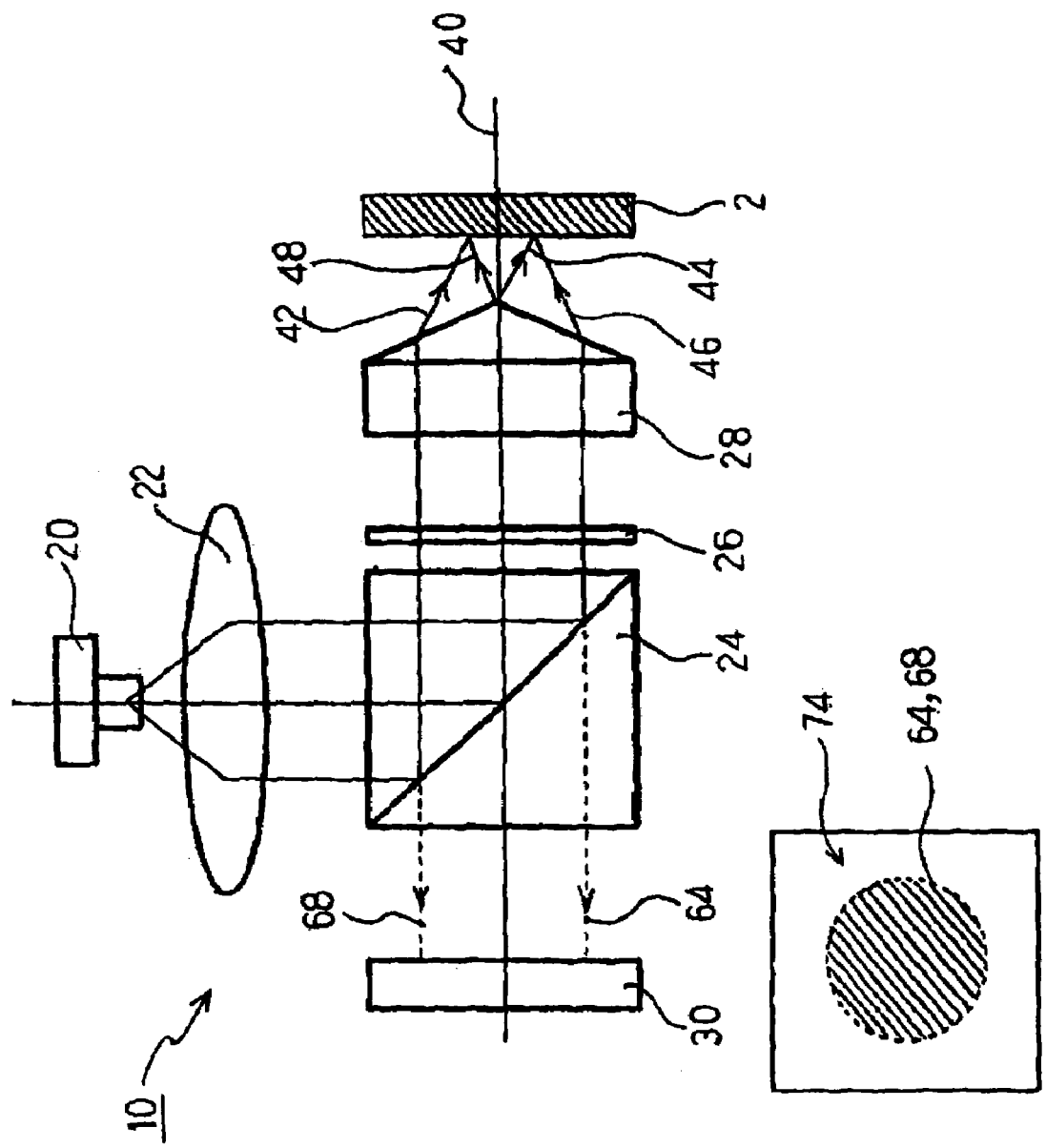
FIG. 5A is a diagram showing a structure with an object located at a near-side intersecting point of the measurement range according to the embodiment of the present invention.
FIG. 5B is a diagram showing a shape of the image detected by the detection section under FIG. 5A condition.

FIGS. 3 through 5 are diagrams for explaining a function of the optical displacement measurement device 10 having the structure described above. The explanation is made by referring to the shape of the image of an object 2 which is placed in a predetermined position, the image being detected by the detection section 30. In these drawings, the diagram (a) shows the trajectory of the advancing light with the object 2 placed in the optical displacement measurement device 10, and the diagram (b) shows the shape of the image detected by the detection section 30.

FIG. 3 shows a situation in which an object 2 is located in substantially the middle of the measurement range 54 described in FIG. 2. Elements corresponding to those of FIG. 2 are denoted using corresponding reference numerals and descriptions are not repeated. In order to facilitate tracing of the light reflected from the object 2, it is determined that the light 42 incident to the object 2 advances as light 62. Likewise, the light 44 advances as light 64; the light 46 advances as light 66; and light 48 advances as light 68.

The trajectories of the lights 62, 66, which correspond to the outermost running light of the entire light incident to the objective lens 28, are indicated by the broken line of longer dots, while those of the light 64, 68, which correspond to the light advancing along the central optical axis, are indicated by the broken line of shorter dots.

As can be seen from FIG. 3, the light refracted by the conical objective lens 28 and advancing toward the object 2 is reflected by the object 2 back towards the objective lens 28. The returning light is resultantly offset relative to the central optical axis 40. Therefore, an image 70 having a substantially doughnut ring shape with a blank central portion is detected by the detection section 30.

FIG. 4 shows a situation in which an object 2 is located at the far-side intersecting point 50, or the boundary on the farther point of the measurement range 54, as described with reference to FIG. 2. The respective light trajectories are identified using the reference numerals used in a corresponding manner in FIG. 3. In this case, the light reflected from the object 2 and returning through the objective lens 28 exhibits the maximum offset relative to the central optical axis 40, so that an image 72 having a round blank central portion is detected by the detection section 30. The diameter of the blank central potion is equal to the spot diameter of the light incoming into the objective lens 28 from the light source 20.

FIG. 5 shows an example in which an object 2 is located at the near-side intersecting point 52, or the boundary on the nearer point of the measurement range 54, as described with reference to FIG. 2. The respective light trajectories are identified by the corresponding reference numerals used in FIG. 3. In this case, the light reflected from the object 2 and returning through the objective lens 28 exhibits no offset relative to the central optical axis 40.

Therefore, a round image 74 without a blank central portion is detected by the detection section 30. The diameter of the image is equal to the spot diameter of the light incoming to the objective lens 28 from the light source 20.

It can be conclusively understood from FIGS. 3 through 5 that a displacement of the object 2 relative to the objective lens 28 can be known by detecting change in the shape of the image formed in the detection section 30. In particular, when a spot light of a collimated beam having a round cross section is emitted from the light source, the resultant image has a substantial doughnut ring shape, and measurement of the inner and outer diameters of the ring shape makes it possible to measure the displacement of the object.

Preferably, the inner diameter of the substantial doughnut-shaped ring of the image is measured, and the measured inner diameter is applied to a conversion means prepared in advance, such as a conversion expression or a look-up table, to determine a displacement of the object. Conversion can be achieved based on the corn vertex angle of the conical objective lens 28, the refraction rate of the objective lens 28, or the like. Alternatively, a calibration sample may be employed for the conversion. Still alternatively, a microcomputer or the like may be used for real time calculation of an object displacement based on image data obtained by the detection section 30. Further, based on the displacement, motion-related values of the object, including speed, acceleration, or the like, can be obtained.

The object 2 may be placed inclining relative to the central optical axis 40. In such a case, an elliptical, rather than round, image is detected by the detection section 30. As the maximum diameter of the elliptical image remains unchanged irrespective of the inclination angle, when the maximum diameter of the image is measured in measurement of the image having a substantially circular doughnut shape, influence of the inclination of the object 2 can be reduced.

What is claimed is:

1. An optical displacement measurement device for introducing light from a light source to an object through an optical system having an objective lens and for detecting light reflected from the object by a detection section to thereby measure a displacement of the object relative to the objective lens, wherein the objective lens is a conical lens for advancing the light toward the object and for receiving light reflected from the object to direct to the detection section, and the displacement of the object relative to the objective lens is measured in consideration that a shape of a detected image detected by the detection section varies depending on the displacement of the object relative to the objective lens, wherein the conical objective lens is a lens having a conical shape for receiving and refracting the light reflected from the object when the object is placed in a displacement measurement range defined between a far-side intersecting point and a near-side intersecting point, such that the light returns toward a detection section side and forms an image of the object, the size of which varies according to the displacement of the object relative to the objective lens, the far-side intersecting point being a point at which an outermost running light which is refracted at an external circumferential portion of the conical objective lens intersects a central optical axis of the conical objective lens, and the near-side intersecting point being a point at which a light portion refracted at a tip end of the conical objective lens intersects the outermost running light.

2. The optical displacement measurement device according to claim 1, wherein the detected image is substantially doughnut-shaped.

3. The optical displacement measurement device according to claim 2, wherein the displacement is measured based on an inner diameter of the substantially doughnut-shaped detected image.

4. The optical displacement measurement device according to claim 3, wherein the displacement is measured based on a maximum inner diameter of the substantially doughnut-shaped detected image.

5. The optical displacement measurement device according to claim 1, wherein the detection section has an image sensing device.

6. The optical displacement measurement device according to claim 1, wherein the optical system comprises a beam splitter for splitting a collimated beam from the light source and advancing light of S polarized component towards the object; a quarter-wavelength retardation plate for converting the light of S polarized component advancing from the beam splitter into light of circular polarization before a resultant light advances toward the object, and for converting light of circular polarization reflected from the object into light of P polarized component before a resultant light returns to the beam splitter; and an objective lens having a conical shape and provided between the quarter-wavelength retardation plate and the object, and an image formed by the light of P polarized component returning from the object and passing through the quarter-wavelength retardation plate and the beam splitter is detected using the detection section.

7. The optical displacement measurement device of claim 1, wherein the conical objective lens is disposed such that a point of the conical lens faces the object.

* * * * *

UNITED STATES PATENT AND TRADEMARK OFFICE
CERTIFICATE OF CORRECTION

PATENT NO. : 7,330,278 B2  Page 1 of 1
APPLICATION NO. : 11/080907
DATED : February 12, 2008
INVENTOR(S) : Iwamoto et al.

It is certified that error appears in the above-identified patent and that said Letters Patent is hereby corrected as shown below:

On the Title Page Item (56), References Cited, insert
--OTHER PUBLICATIONS, "Applied Optice, Instroduction to Optical Measurement", written by Toyohiko Yatagai, 4th version, Maruzen, Co., Ltd., March 15, 1992, pp. 120-124 (page 1 of spec.).--

Signed and Sealed this

Twenty-seventh Day of May, 2008

JON W. DUDAS
*Director of the United States Patent and Trademark Office*